3,355,025
FILTER MANIFOLD
Walter J. Kudlaty, Elmhurst, Ill., assignor to Marvel Engineering Company, Chicago, Ill., a corporation of Delaware
Filed Oct. 1, 1965, Ser. No. 492,209
3 Claims. (Cl. 210—249)

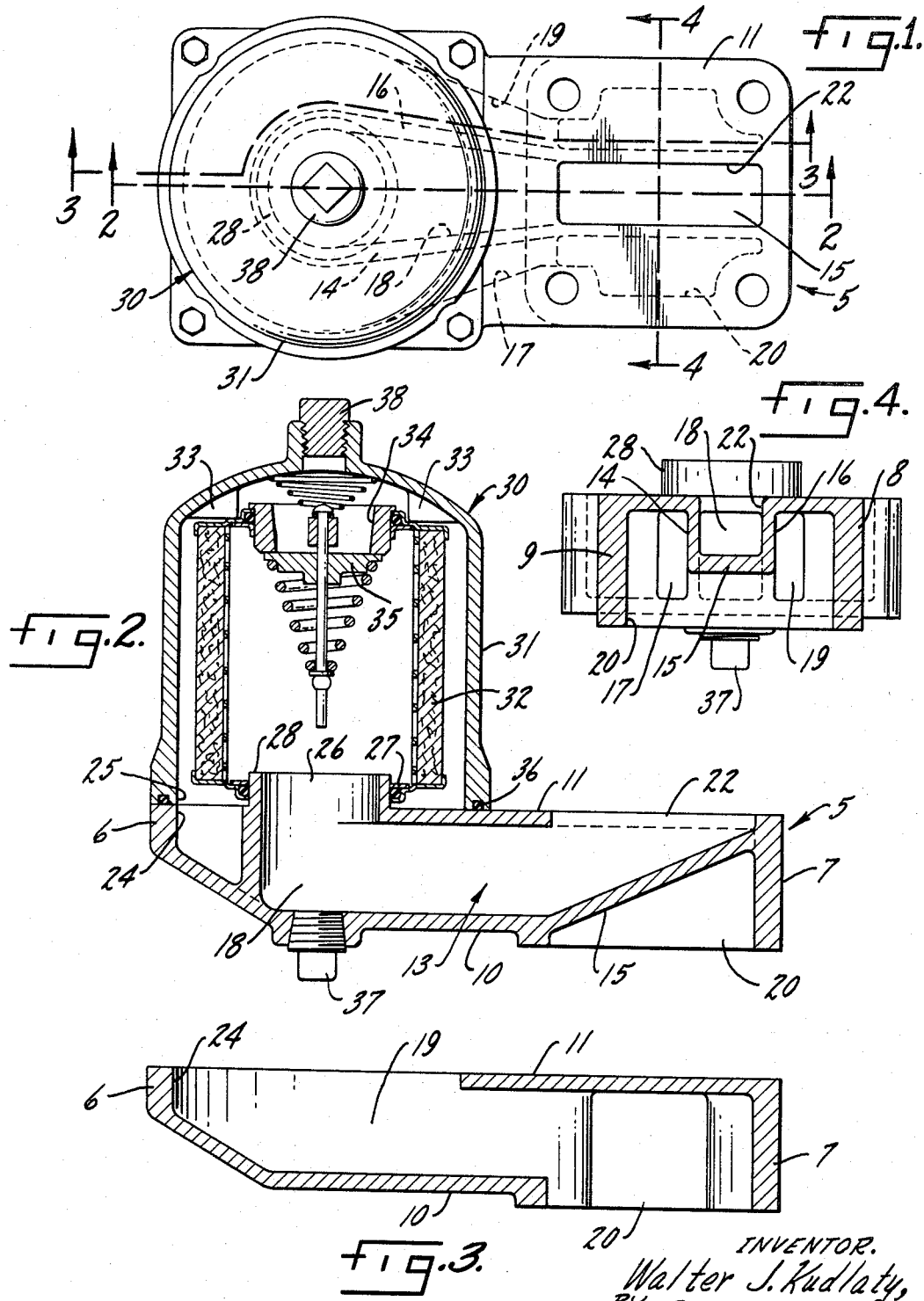

This invention is concerned with a filter assembly housing manifold and more particularly with a manifold for an offset filter assembly housing.

An object of this invention is a filter assembly housing manifold in which the spacing between the unfiltered fluid inlet and the filtered fluid outlet is minimized.

Another object is a filter assembly housing manifold that is extremely compact.

Another object is a compact offset filter assembly housing manifold capable of handling fluid with minimum friction loss.

Other objects may be found in the ensuing specification, claims and drawings in which:

FIGURE 1 is a top plan view of the filter assembly housing and manifold;

FIGURE 2 is a cross-sectional view taken substantially along line 2—2 of FIGURE 1;

FIGURE 3 is a cross-sectional view taken substantially along line 3—3 of FIGURE 1; and FIGURE 4 is a cross-sectional view taken substantially along line 4—4 of FIGURE 1.

The offset filter assembly housing manifold of the invention may be cast in the form of an elongated hollow body 5 of generally rectangular lateral cross-section and having end walls 6 and 7, side walls 8 and 9 and generally planar opposed walls 10 and 11 defining an interior chamber 13. Interior partitions or webs 14 and 16 may be formed as part of the casting to extend longitudinally of the body between the generally planar walls 10 and 11 to divide the chamber 13 into longitudinally extending passages 17, 18 and 19 with the interior passage 18 positioned between and separating the exterior passages 17 and 19. Partitions 14 and 16 merge adjacent one end of the chamber to connect passages 17 and 19. The merger of these partitions forms an end wall for passage 18.

An inlet opening 20 adapted to be connected to a source of unfiltered fluid such as a conduit may be formed in the planar wall 10 adjacent one end thereof to open into the chamber 13. A manifold outlet opening 22 may be formed in the planar wall 11 to connect a discharge outlet for the filtered fluid with the chamber 13. The inlet and outlet openings are formed in the body 5 in alignment with each other. To separate the manifold inlet and outlet, a partition 15 is formed to intersect and join the partitions 14 and 16 across the openings 20 and 22. This partition is sloped from the end wall 7 to the planar wall 10 across the openings to improve flow characteristics of the passages.

A semi-annular opening 24 adapted to communicate with an inlet 25 of a filter assembly housing is formed in the planar wall 11 at the merger of passages 17 and 19. The interior or center passage 18 of the body leads to an opening 26 in the wall 11 which opening is adapted to communicate with a filter housing outlet 27. Opening 26 is defined by an annular wall 28 which rises out of the body and is concentric with and generally surrounded by semiannular opening 24.

A filter assembly housing of the type that can be connected to the manifold of this invention is generally indicated by the numeral 30. This assembly includes a cup shaped housing 31 adapted to receive a filter element 32 and having shoulders 33 to position said filter element therein. The filter element is also adapted to be supported on the annular wall 28 that surrounds the central passage opening 26 of the manifold. If desired, the filter element may be provided with a by-pass 34 having a spring operated valve 35 adjusted to open when the pressure drop through the filter element exceeds a predetermined amount. A ring seal 36 may be provided between the filter housing 31 and the manifold body 5. Drain plugs 37 and 38 may be provided, respectively, for the passage 18 and the housing 31.

The use, function and operation of the invention are as follows:

The filter assembly housing manifold of the invention is designed to permit the installation of a filter assembly housing in locations providing insufficient space between the source of the unfiltered fluid and the receptacle for the filtered fluid to permit the installation of a normal size manifold. Typical of such locations are those in which a filter must be connected to a very short conduit or in which there is very litle space between a fluid reservoir and a pump. To permit the installation of a filter assembly housing in such locations, the manifold is constructed so that its fluid supply inlet and outlet openings are located at one end thereof in alignment with each other and the connections to and from the filter assembly housing are located at the opposite end. With a construction such as this, the filter assembly housing can be offset from the inlet and outlet openings of the fluid supply. Consequently, the spacing between the inlet and outlet of the manifold can be reduced to a minimum, for example to less than the diameter of a filter assembly housing. The length of the manifold can be adjusted for an individual installation with the only requirement that it be sufficiently long to accommodate the filter assembly housing clear of the conduit or other parts of equipment to which it is attached.

The manifold channels the fluid in the following manner: The opening 20 of the manifold is adapted to be connected to a source of unfiltered fluid. The unfiltered fluid enters this opening and flows into passages 17 and 19 which carry it through the manifold housing to the semi-annular outlet 24. The fluid then flows into the filter housing 31 through the inlet 25, through the filter element 32 and returns to the manifold through the opening 26 and into the passage 18. From the passage 18, the fluid flows out of the manifold through the outlet 22 and into the filtered fluid receptacle or conduit. Upon clogging of the filter 32, the pressure differential across the filter will increase until the valve 35 opens permitting flow through the by-pass 34 and into the manifold through the opening 26.

I claim:

1. A manifold for connecting a filter assembly housing between a source of unfiltered fluid and a receptacle for filtered fluid including:
   an elongated hollow body having an interior chamber divided into a plurality of side-by-side passages by longitudinally extending partitions,
   an inlet to said chamber adapted to be connected to said source of unfiltered fluid and an outlet from said chamber adapted to be connected to the receptacle for said filtered fluid with said inlet and outlet being spaced apart on opposite sides of said body in alignment with each other,
   an outlet to a filter assembly housing from said body and an inlet from said housing formed in said body with said outlet and inlet being concentric and the outlet surrounding the inlet,
   at least one of said passages connecting said chamber inlet to said filter assembly housing outlet, and
   at least another one of said passages connecting said filter housing inlet with said chamber outlet, said longitudinally extending partitions dividing the interior chamber into three passages with the outer passages connecting the same inlet and outlet.

2. The structure of claim 1 further characterized in that the outer passages connect the chamber inlet to the chamber filter housing outlet.

3. An manifold for connecting a filter assembly housing between a source of unfiltered fluid and a receptacle for filtered fluid including:
- an elongated hollow body of generally rectangular cross-section defining an interior chamber and having end walls, side walls and a pair of opposed generally planar walls defining said chamber,
- a pair of longitudinal partitions located in said chamber and extending between said opposed planar walls to divide said chamber into two outer and one inner side-by-side passages,
- said partitions mereging adjacent one end of said chamber to merge the outer passages,
- an opening in one of said planar walls at the opposite end of said body forming an inlet for said outer passages,
- an opening in the opposite wall of said body in alignment with said first opening and forming an outlet for said inner passage,
- a third partition extending across said openings and between said longitudinal partitions to separate said inner passage from said inlet opening, and
- an outlet opening for said outer passages formed in one of said planar surfaces adjacent the merger of said partitions and an inlet opening to said inner passage from said filter assembly housing formed in said planar surface with said outlet and inlet being concentric and the outlet surrounding the inlet.

References Cited
UNITED STATES PATENTS

| | | | |
|---|---|---|---|
| 2,633,991 | 4/1953 | Beatty | 210—249 X |
| 3,217,942 | 11/1964 | Humbert et al. | 210—443 X |

SAMIH N. ZAHARNA, *Primary Examiner.*

F. MEDLEY, *Assistant Examiner.*